(12) United States Patent
Yamada et al.

(10) Patent No.: US 6,500,536 B1
(45) Date of Patent: Dec. 31, 2002

(54) HEAT ACTIVATABLE ADHESIVE COMPOSITION AND ADHESIVE SHEET HAVING ADHESIVE LAYER THEREOF

(75) Inventors: Hiroshi Yamada, Numazu; Masanaka Nagamoto, Susono; Akira Ichikawa, Numazu, all of (JP)

(73) Assignee: Ricoh Company, Ltd., Tokyo (JP)

( * ) Notice: Subject to any disclaimer, the term of this patent is extended or adjusted under 35 U.S.C. 154(b) by 71 days.

(21) Appl. No.: 09/661,444

(22) Filed: Sep. 13, 2000

(30) Foreign Application Priority Data

Sep. 14, 1999 (JP) ............................................. 11-260342

(51) Int. Cl.[7] .............................. B32B 15/04; B32B 7/12
(52) U.S. Cl. ................... 428/346; 428/343; 428/355 R; 428/352; 428/353; 428/354
(58) Field of Search ............................ 428/343, 355 R, 428/346, 352, 353, 354

(56) References Cited

U.S. PATENT DOCUMENTS

| | | | | |
|---|---|---|---|---|
| 4,966,301 A | * | 10/1990 | Yamashita et al. .......... | 220/270 |
| 5,013,711 A | * | 5/1991 | Egashira et al. ............. | 428/195 |
| 5,418,208 A | * | 5/1995 | Takeda et al. ............... | 428/195 |
| 5,527,757 A | * | 6/1996 | Uyttendaele et al. ........ | 503/201 |
| 5,527,759 A | * | 6/1996 | Oshima et al. .............. | 428/195 |
| 5,681,626 A | * | 10/1997 | Hosokawa et al. .......... | 138/141 |
| 5,747,573 A | * | 5/1998 | Ryan ........................... | 524/270 |
| 5,795,696 A | * | 8/1998 | Malhotra ..................... | 156/230 |
| 5,912,204 A | | 6/1999 | Yamada et al. | |

FOREIGN PATENT DOCUMENTS

| | | |
|---|---|---|
| DE | 38 27 060 | 4/1990 |
| EP | 0 905 211 | 3/1999 |
| JP | 11-263960 | 9/1999 |
| WO | WO 96/34767 | 11/1996 |

* cited by examiner

*Primary Examiner*—James J. Seidleck
*Assistant Examiner*—Travis B Ribar
(74) *Attorney, Agent, or Firm*—Oblon, Spivak, McClelland, Maier & Neustadt, P.C.

(57) ABSTRACT

A heat activatable adhesive composition including a thermoplastic resin, and a hindered phenol compound which is solid at 20° C. and which is fusible at an elevated temperature. The adhesive composition is useful as a heat activatable adhesive layer of labels or sheets including a heat-sensitive recording label.

14 Claims, No Drawings

HEAT ACTIVATABLE ADHESIVE COMPOSITION AND ADHESIVE SHEET HAVING ADHESIVE LAYER THEREOF

BACKGROUND OF THE INVENTION

The present invention relates to a heat activatable adhesive composition and to an adhesive sheet or tape having an heat activatable adhesive layer.

Conventional adhesive sheets generally have a pressure-sensitive adhesive layer provided on a support with a liner (i.e., disposable backing sheet) being attached to the adhesive layer. In use, such a liner is removed and discarded. In view of problems caused by the use of liners, there are proposed adhesive sheets having a heat activatable adhesive layer but having no liner, that is, liner-free adhesive sheets.

The heat activatable adhesive layer is of a type which is not adhesive at room temperature but becomes adhesive when heated at an elevated temperature. The adhesive composition for use in the heat activatable adhesive layer is generally composed of a thermoplastic resin, a plasticizer and, optionally, a tackifier. The thermoplastic resin exhibits adhesiveness when plasticized. The plasticizer assumes a solid state at room temperature but is melted by the application of heat thereto to plasticize or swell the thermoplastic resin and to actualize the adhesiveness of the resin. The tackifier is used for improving the tackiness of the thermoplastic resin.

The heat activatable adhesive sheets are utilized in a wide variety of fields, for example, in the system of Point of Sales (POS) in which a heat activatable adhesive label is attached onto a wrapping film covering food. As the wrapping film, polyolefin films are substituted for conventional polyvinyl chloride films which cause environmental problems. Known heat activatable adhesive sheets, however, have a problem because its adhesion to polyolefin surfaces is not satisfactory.

JP-A-H09-265260 discloses an adhesive sheet including a substrate, an undercoat (heat insulation) layer provided on the substrate and containing hollow fine particles, a heat-sensitive recording layer provide on the undercoat layer, and a heat activatable layer provided on the substrate opposite the recording layer and containing dicyclohexyl phthalate as a plasticizer.

The conventional heat activatable adhesive sheet has another drawback that blocking phenomenon occurs when the sheet is stored in rolled form for a long period of time at a temperature of, for example, 40° C. There is a demand for a heat activatable adhesive sheet which does not cause blocking at a temperature of 50° C.

Known heat activatable adhesive sheets have a further problem because of the use of a phthalate as a plasticizer. The phthalate compounds are likely to adversely affect reproduction function through a food cycle.

SUMMARY OF THE INVENTION

It is, therefore, an object of the present invention to provide a heat activatable adhesive composition which can exhibit strong adhesiveness and excellent anti-blocking properties.

Another object of the present invention is to provide a heat activatable adhesive composition which can exhibit strong adhesiveness to polymer surfaces such as polyolefin surfaces.

It is a further object of the present invention to provide a heat activatable adhesive composition which does not contain a phthalate compound.

It is yet a further object of the present invention to provide a sheet having a heat activatable adhesive layer.

It is a further object of the present invention to provide sheet having (a) a heat activatable adhesive layer and (b) a heat-sensitive recording layer or an image receiving layer adapted for receiving an ink image transferred from an ink ribbon.

In accordance with the present invention there is provided a heat activatable adhesive composition comprising a thermoplastic resin, and a plasticizer including a hindered phenol compound which is solid at 20° C. and which is fusible at an elevated temperature.

Other objects, features and advantages of the present invention will become apparent from the detailed description of the preferred embodiments of the invention to follow.

DETAILED DESCRIPTION OF THE PREFERRED EMBODIMENTS OF THE INVENTION

A heat activatable adhesive composition according to the present invention comprises a thermoplastic resin, a specific plasticizer and, optionally, a tackifier.

The thermoplastic resin is not particularly limited in the present invention, but the following polymeric resins can be preferably employed: a latex of natural rubber to which a vinyl monomer is graft-copolymerized, a natural rubber latex, polyvinyl acetate, polymethacrylate such as polybutyl methacrylate, synthetic rubber, vinyl acetate-2-ethylhexyl acrylate copolymer, vinyl acetate-ethylene copolymer, vinyl pyrrolidone-styrene copolymer, vinyl pyrrolidone-acrylate copolymer such as vinyl pyrrolidone-ethyl acrylate copolymer and styrene-acrylate compolymer. The amount of the thermoplastic resin in the adhesive composition is generally 10–70% by weight, preferably 20–60% by weight, for reasons of adhesiveness.

As the plasticizer, a hindered phenol compound which is solid at 20° C. and which is fusible at an elevated temperature is used. The melting point of the hindered phenol compound is preferably at least 50° C., more preferably at least 60° C., for reasons of satisfactory anti-blocking property of an adhesive layer of the heat activatable adhesive composition. The upper limit of the melting point of the hindered phenol compound is preferably 150° C. for reasons of heat sensitivity of the heat activatable adhesive layer.

The hindered phenol compound is preferably at least one compound selected from those represented by the following formulas (I) through (IV):

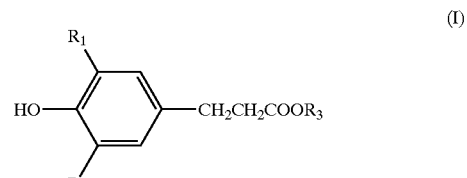

(I)

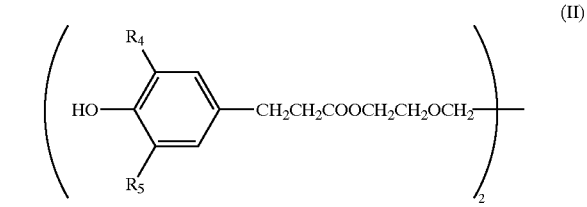

(II)

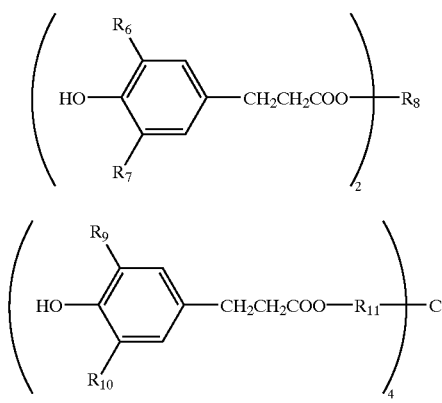

wherein $R_1$, $R_2$, $R_3$, $R_4$, $R_5$, $R_6$, $R_7$, $R_9$, and $R_{10}$ independently stand for an alkyl group, and $R_8$ and $R_{11}$ each stand for a divalent hydrocarbyl group.

The alkyl groups $R_1$, $R_2$, $R_3$, $R_4$, $R_5$, $R_6$, $R_7$, $R_9$ and $R_{10}$ each have preferably 1–20 carbon atoms, more preferably 1–12 carbon atoms. Most preferably, $R_1$, $R_2$, $R_4$, $R_5$, $R_6$, $R_7$, $R_9$ and $R_{10}$ are each —$CH_3$ or —$CH_2H_5$ or an α-branched alkyl group having 3–10 carbon atoms, such as tert-butyl, while $R_3$ is a lower alkyl having 1–8 carbon atoms. Preferably, the divalent hydrocarbyl groups $R_8$ and $R_{11}$ are each an alkylene group having 1–12 carbon atoms.

The amount of the hindered phenol compound in the adhesive -composition is preferably 30–70% by weight, more preferably 35–65% by weight, for reasons of satisfactory adhesiveness.

In addition to the hindered phenol compound, the plasticizer can contain one or more conventional plasticizers, if desired. Examples of such conventional plasticizers include diphenyl phthalate, dihexyl phthalate, dicyclohexyl phthalate, dihydroabietyl phthalate, dimethyl isophthalate, sucrose benzoate, ethylene glycol dibenzoate, trimethylolethane tribenzoate, glyceride tribenzoate, pentaerythritol tetrabenzoate, sucrose octacetate, tricyclohexyl citrate and N-cyclohexyl-p-toluene-sulfonamide. The amount of the plasticizer in the adhesive composition is preferably in the range of 30 to 70% by weight, more preferably in the range of 35 to 65 wt % by weight, of the total weight of the adhesive composition for reasons of satisfactory adhesiveness of the adhesive composition.

It is preferred that the adhesive composition contain a tackifier for reasons of improved adhesiveness of thereof. The tackifier preferably has a melting point or softening point of at least 70° C., more preferably 70–200° C. for reasons of satisfactory anti-blocking property of a heat activatable adhesive layer formed of the adhesive composition. Examples of suitable tackifier include rosins and derivatives thereof (such as polymerized rosin, hydrogenated rosin, esters of the above-mentioned rosins with polyhydric alcohols such as glycerin and pentaerythritol, and diners of resin acid); terpene resins; petroleum resins; phenolic resins; and xylene resins. The tackifier is used in an amount of 3 to 30% by weight, more preferably 5 to 25% by weight based on the total weight of the adhesive composition.

In one embodiment of the present invention, the heat activatable adhesive composition is used for a label or sheet including a substrate and an adhesive layer of the heat activatable adhesive composition provided on a surface of the substrate.

In another embodiment of the present invention, the heat activatable adhesive composition is used for a heat-sensitive recording label or sheet. The label includes a substrate, a heat-sensitive recording layer provided on one surface of the substrate, and an adhesive layer of the heat activatable adhesive composition provided on the other surface of the substrate.

The heat-sensitive recording layer contains one or more leuco dyes as a coloring agent. Suitable leuco dyes for use in the coloring layer, which may be employed alone or in combination, include any known leuco dyes for use in the conventional thermosensitive recording materials. For example, triphenylmethane-type leuco compounds, fluoran-type leuco compounds, phenothiazine-type leuco compounds, auramine-type leuco compounds, spiropyran-type leuco compounds, and indolinophthalide-type leuco compounds are preferably employed.

Specific examples of such leuco dyes include:

3,3-bis(p-dimethylaminophenyl)phthalide,
3,3-bis(p-dimethylaminophenyl)-6-dimethylaminophthalide (i.e., Crystal Violet Lactone),
3,3-bis p-dimethylaminophenyl)-6-diethylaminophthalide,
3,3-bis(p-dimethylaminophenyl)-6-chlorophthalide,
3,3-bis(p-dibutylaminophenyl)phthalide,
3-cyclohexylamino-6-chlorofluoran,
3-dimethylamino-5,7-dimethylfluoran,
3-diethylamino-7-chlorofluoran,
3-diethylamino-7-methylfluoran,
3-diethylamino-7,8-benzfluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-[N-(3'-trifluoromethylphenyl)amino]-6-diethylaminofluoran,
2-[3,6-bis(diethylamino)-9-(o-chloroanilino)xanthyl]-benzoic acid lactam,
3-diethylamino-6-methyl-7-(m-trichloromethylanilino)fluoran,
3-diethylamino-7- (o-chloroanilino) fluoran,
3-di-n-butylamino-7-(o-chloroanilino)fluoran,
3-(N-methyl-N-n-amylamino)-6-methyl-7-anilinofluoran,
3-(N-methyl-N-cyclohexylamino)-6-methyl-7-anilinofluoran,
3-diethylamino-6-methyl-7-anilinofluoran,
3-(N, N-diethylamino)-5-methyl-7-(N,N-dibenzylamino) fluoran, benzoyl leuco methylene blue,
6'-chloro-8'-methoxybenzoindolino spiropyran,
6'-bromo-3'-methoxybenzoindolino spiropyran,
3-(2'-hydroxy-4'-dimethylaminophenyl)-3-(2'-methoxy-5'-chlorophenyl)phthalide,
3-(2'-hydroxy-4'-dimethylaminophenyl)-3-(2'-methoxy-5'-nitrophenyl)phthalide,
3-(2'-hydroxy-4'-diethylaminophenyl)-3-(2'-methoxy-5'-methylphenyl)phthalide,
3-diethylamino-6-methyl-7-(2',4'-dimethylanilino)fluoran,
3-(2'-methoxy-4'-dimethylaminophenyl)-3-(2'-hydroxy-4'-chloro-5'-methylphenyl) phthalide,
3,6-bis(dimethylamino)fluorenespiro(9,3')-6'-dimethylaminophthalide,
3-(p-dimethylaminophenyl)-3-{1,1-bis(p-dimethylaminophenyl)ethylene-2-yl}phthalide,
3-(p-dimethylaminophenyl)-3-{1,1-bis(p-dimethylaminophenyl)ethylene-2-yl}-6-dimethylaminophthalide,
3-(p-dimethylaminophenyl)-3-(1-p-dimethylaminophenyl)-1-phenylethylene-2-yl}phthalide, 3-(p-dimethylaminophenyl)-3-(1-p-dimethylamino-1-p-chlorophenylethylene-2-yl}-6-dimethylaminophthalide,
3-(4'-dimethylamino-2'-methoxy)-3-(1"-p-dimethylaminophenyl-1"-p-chlorophenyl-1",3"-butadiene-4"-yl)benzophthalide,
3-(4'-dimethylamino-2'-benzyloxy)-3-(1"-p-dimethylaminophenyl-1"-phenyl-1",3"-butadiene-4"-yl)benzophthalide,
3-dimethylamino-6-dimethylaminofluorene-9-spiro-3'-(6'-dimethylaminophthalide,
3,3-bis{2-(p-dimethylaminophenyl)-2-(p-methoxyphenyl)ethenyl}4,5,6,7-tetrachlorophthalide,
3-bis{1,1-bis(4-pyrrolidinophenyl)ethylene-2-yl-5,6-dichloro-4,7-dibromophthalide, bis(p-dimethylaminostyryl)-1-naphthalenesulfonylmethane,
3-(N-ethyl-N-tetrahydrofurfurylamino)-6-methyl-7-anilinofluoran,
3-(N-ethyl-N-2-ethoxypropylamino)-6-methyl-7-anilinofluoran,
3-N-methyl-N-isobutyl-6-methyl-7-anilinofluoran,
3-morphorino-7-(N-propyltrifluoromethylanilino)fluoran,
3-pyrrolidino-7-trifluoromethylanilinofluoran,
3-diethylamino-5-chloro-7-(N-benzyltrifluoromethylanilino)fluoran,
3-pyrrolidino-7-(di-p-chlorophenyl)methylaminofluoran,
3-diethylamino-5-chloro-7-(α-phenylethylamino)fluoran,
3-(N-ethyl-p-toluidino)-7-(α-phenylethylamino)fluoran,
3-diethylamino-7-(o-methoxycarbonylphenylamino)fluoran,
3-diethylamino-5-methyl-7-(α-phenylethylamino)fluoran,
3-diethylamino-7-piperidinofluoran,
2-chloro-3-(N-methyltoluidino)-7-(p-n-butylanilino)fluoran,
3-(N-methyl-N-isopropylamino)-6-methyl-7-anilinofluoran,
3-di-n-butylamino-6-methyl-7-anilinofluoran,
3-(N-benzyl-N-cyclohexylamino)-5,6-benzo-7-α-naphthylamino-4'-bromofluoran,
3-diethylamino-6-chloro-7-anilinofluoran,
3-diethylamino-6-methyl-7-mesidino-4',5'-benzofluoran,
3-N-methyl-N-isopropyl-6-methyl-7-anilinofluoran,
3-N-ethyl-N-isoamyl-6-methyl-7-anilinofluoran, and
3-diethylamino-6-methyl-7-(2',4'-dimethylanilino)fluoran.

The heat-sensitive recording layer also contains a developer. Any conventional electron acceptor or oxidizing agent which works upon the above-mentioned leuco dyes to induce color formation, such as phenol compounds, thiophenol compounds, thiourea compounds, organic acids and metal salts of organic acids, can be employed. Specific examples of such color developers include:

4,4'-isopropylidenediphenol,
3,4'-isopropylidenebisphenol,
4,4'-isopropylidenebis(o-methylphenol),
4,4'-sec-butylidenebisphenol,
4,4'-isopropylidenebis(2-tert-butylphenol),
2,2'-methylenebis(4-ethyl-6-tert-butylphenol), zinc p-nitrobenzoate,
1,3,5-tris(4-tert-butyl-3-hydroxy-2,6-dimetylbenzyl)-isocyanuric acid,
2,2-(3,4'-dihydroxydiphenyl)propane,
11,3-bis(4-hydroxyphenylthio)-2-hydroxypropane,
5bis(4-hydroxy-3-methylphenyl)sulfide,
4-[β-(p-methoxyphenoxy)ethoxy]salicylate,
1,7-bis(4-hydroxyphenylthio)-3,5-dioxaheptane,
1,5-bis(4-hydroxyphenylthio)-5-oxapentane, monocalcium salt of monobenzylphthalate,
4,4'-cyclohexylidenediphenol,
4,4'-isopropylidenebis(2-chlorophenol),
2,2'-methylenebis(4-methyl-6-tert-butylphenol),
4,4'-butylidenebis(6-tert-butyl-2-methyl)phenol,
1,1,3-tris(2-methyl-4-hydroxy-5-tert-butylphenyl)butane,
1,1,3-tris(2-methyl-4-hydroxy-5-cyclohexylphenyl)butane,
4,4'-thiobis(6-tert-butyl-2-methyl)phenol,
4,4'-diphenolsulfone,
4,2'-diphenolsulfone,
4-isoproxy-4'-hydroxydiphenylsulfone,
20 4-benzyloxy-4'-hydroxydiphenylsulfone,
4,4'-diphenolsulfoxide,
isopropyl p-hydroxybenzoate,
benzyl p-hydroxybenzoate,
benzyl protocatechuate,
stearyl gallate,
lauryl gallate,
octyl gallate,
1,3-bis(4-hydroxyphenylthio)propane,
N,N'-diphenylthiourea,
N,N'-di(m-chlorophenyl)thiourea,
salicylanilide,
5-chlorosalicylanilide,
salicyl-o-chloroanilide,
bis(4-hydroxyphenyl)methyl acetate,
bis(4-hydroxyphenyl)benzyl acetate,
1,3-bis(4-hydroxycumyl)benzene,
1,4-bis(4-hydroxycumyl)benzene,
2,4'-diphenolsulfone,
3,3'-diallyl-4,4'-diphenolsulfone,
3,4-dihydroxy-4-methyldiphenylsulfone,
antipyrin complex of zinc thiocyanate,
2-hydroxy-3-naphthoic acid,
2-hydroxy-1-naphthoic acid,
1-hydroxy-2-naphthoic acid,
metal(zinc, aluminum, calcium, etc.) salts of hydroxynaphthoic acid,
zinc 1-acetyloxy-2-naphthoate,
zinc 2-acetyloxy-1-naphthoate,
zinc 2-acetyloxy-3-naphthoate,
α,αbis(4-hydroxyphenyl)-α-methyltoluene,
tetrabromobisphenol A,
tetrabromobisphenol S,
4,4'-thiobis(2-methylphenol), and
4,4'-thiobis(2-chlorophenol).

These developers are employed alone or in combination.
The developer is used in an amount of from about 1 to about 20 parts, more preferably from about 2 to about 10 parts by weight, per 1 part by weight of the coloring agent.
The heat-sensitive recording layer further contains a binder resin. Any conventionally employed binder such as a water-soluble polymer may be suitably used for the purpose of the present invention. Examples of binder resins include polyvinyl alcohol starch and starch derivatives cellulose derivatives such as methoxy cellulose, hydroxyethyl cellulose, carboxymethyl cellulose, methyl cellulose and ethyl cellulose, sodium polyacrylate, polyvinyl pyrrolidone, acrylamide-acrylic ester copolymer, acrylamide-acrylic ester-methacrylic acid terpolymer, alkali salts of styrene-maleic anhydride copolymer, polyacrylamide, sodium alginate, gelatin and casein. An aqueous polymer emulsion of polyvinyl acetate, polyurethane, polyacrylic acid, polyacrylate, polymethacrylate, polybutylmethacrylate, vinyl chloride-vinyl acetate copolymer or ethylene-vinyl acetate copolymer, or a latex of styrene-butadiene copolymer and styrene-butadiene-acrylic copolymer may also be used as the binder.

The heat-sensitive recording layer may contain a heat-fusible material preferably having a melting point of 50–200° C. Illustrative of suitable heat-fusible material are fatty acids such as stearic acid and behenic acid; fatty acid esters; fatty amides such as stearamide and palmitamide; fatty acid salts such as zinc stearate, calcium stearate, aluminum stearate, zinc plamitate and zinc behenate; and waxes such as stearate wax, polyethylene wax, carnauba wax, licrocrystalline wax and carboxyl-modified paraffin wax. Other suitable heat-fusible materials include p-benzylbiphenyl, terphenyl, triphenylmethane, benzyl p-benzyloxybenzoate, β-benzyloxynaphthalene, phenyl β-naphthoate, phenyl 1-hydroxy-2-naphthoate, methyl 1-hydroxy-2-naphthoate, diphenyl carbonate, glycol carbonate, dibenzyl terephthalate, dimethyl terephthalate, 1,4-dimethoxynaphthalene, 1,4-diethoxynaphthalene, 1,4-dibenzyloxynaphthalene, 1,2-diphenoxyethane, 1,2-bis(3-methylphenoxy)ethane, 1,2-bis(4-methylphenoxy)ethane, 1,4-diphenoxy-2-butene, 1,2-bis(4-methoxyphenylthio)ethane, dibenzoylmethane, 1,4-diphenylthiobutane, 1,4-diphenylthio-2-butene, 1,3-bis(2-vinyloxyethoxy) benzene, 1-4-bis(2-vinyloxyethoxy)benzene, p-(2-vinyloxyethoxy)biphenyl, p-allyloxybiphenyl, p-propagyloxybiphenyl, dibenzoyloxymethane, dibenzoyloxypropane, dibenzyldisulfide, 1,1-diphenylethanol, 1,1-diphenylpropanol, p-benzyloxybenzyl alcohol, 1,3-phenoxy-2-propanol, N-octadecylcarbamoyl-p-methoxycarbonylbenzene, N-octadecylcarbamoylbenzene, 1,2-bis(4-methoxyphenoxy)propane, 1,5-bis(4-methoxyphenoxy)-3-oxapentane, dibenzyl oxalate, di-p-methylbenzyl oxalate or di-4-chlorobenzyl oxalate.

The heat-sensitive recording layer may additionally contains various conventionally employed additives such as a surfactant, an organic or inorganic filler and a lubricant. Examples of fillers include silica, zinc oxide, aluminum hydroxide, zinc hydroxide, barium sulfate, kaolin, clay, talc, calcium carbonate, magnesium carbonate, calcined clay, titanium oxide, diatomaceous earth, anhydrous silica, activated clay, surface treated calcium, styrene-methacrylic acid copolymer powder, nylon powder, polyethylene powder, polystyrene powder and urea-formaldehyde resin powder.

The heat-sensitive recording layer may be formed on a substrate by any customarily employed method. For example, the above-described leuco dye, developer and an aqueous solution or dispersion of a binder are ground with a ball mill, an attriter or a sand mill into a particle size of 1–3 µm. The resulting dispersion is then mixed with other additives such as a filler and a heat-fusible material to obtain a coating liquid. The coating liquid is applied onto the substrate and dried to form the heat-sensitive recording layer thereon.

If desired, an undercoating layer may be interposed between the substrate and the heat-sensitive layer. An protecting layer (overcoat layer) may also be formed over the heat-sensitive layer. Such undercoating and protecting layers may be constituted of the above-described binder resin and, optionally, filler, heat-fusible material and surfactant. If desired an ink image may be printed on the heat-sensitive recording layer or on the protecting layer. The ink may be, for example, a UV-curable ink.

In a further embodiment of the present invention, the heat activatable adhesive composition is utilized for a heat transfer recording label or sheet including a substrate, an image receiving or accepting layer provided on one surface of the substrate and an adhesive layer of the heat activatable adhesive composition provided on the other surface of the substrate. The image receiving layer is adapted to receive an ink image, by fusion or sublimation transfer, from an ink ribbon which is heated imagewise with a thermal head.

The image receiving layer generally contains a filler and a binder. A water-resistance imparting agent such as a crosslinking agent may be also incorporated into the ink receiving layer.

Examples of the fillers for use in the image receiving layer include inorganic pigments such as calcium carbonate, silica, zinc oxide, titanium oxide, aluminum oxide, aluminum hydroxide, zinc hydroxide, barium sulfate, clay, calcined clay, magnesium silicate, magnesium carbonate, white carbon, kaolin, talc, surface treated calcium carbonate and silica; and organic pigments such as urea-formaldehyde resins, styrene-methacrylic acid copolymers, polystyrene resins.

Suitable binders for use in the image receiving layer include water soluble resins such as polyvinyl alcohol; starch and derivatives thereof; cellulose derivatives such as methoxy cellulose, hydroxyethyl cellulose, carboxymethyl cellulose, methyl cellulose and ethyl cellulose; sodium polyacrylate; polyvinyl pyrrolidone; acrylamide-acrylate copolymers; acrylamide-acrylate-methacrylic acid copolymers; styrene-maleic anhydride alkali metal salts; isobutylene-maleic anhydride alkali metal salts; polyacrylamide; sodium alginate; gelatin; and casein. The binder is generally used in an amount of 0.1 to 0.2 part by weight per part by weight of the filler.

Illustrative of suitable water-resistance imparting agent are formaldehyde, glyoxal, chromium alum, melamine-formaldehyde resins, urea resin, melamine resin, polyamide resins and polyamide-epichlorohydrin resins. The water-resistance imparting agent is generally used in an amount of 0.3 to 0.5 part by weight per part by weight of the binder. The image receiving layer is preferably treated by calendaring to have a surface smoothness of 500 seconds or more for reasons of improved grade of the images.

In a further embodiment of the present invention, the heat activatable adhesive composition is utilized for a double coated adhesive sheet having a substrate and adhesive layers of the adhesive composition formed on both sides of the substrate.

In the foregoing embodiments, a heat insulating layer may be suitably interposed between the substrate and the adhesive layer of the heat activatable adhesive composition for the purpose of improving efficiency in being heated. Such a heat insulating layer may also be interposed, as an undercoat layer, between the substrate and the heat-sensitive recording layer for the purpose of improving heat-sensitivity thereof.

In the present invention, there can be employed (a) a non-expanded insulating layer using (a1) minute void particles with a voidage of 30% or more, each made of a thermoplastic resin as its shell or (a2) a porous pigment; and (b) an expanded insulating layer containing an expanded filler.

The minute void particles with a voidage of 30% or more for use in the former-type insulating layer are minute particles expanded so that air or other gases are contained therewithin. The minute void particles with an average particle size of 2 to 20 µm, preferably 3 to 10 µm are employed. When the average particle diameter (outer diameter) of the minute void particles is 2 µm or less, void particles with a desired voidage cannot be easily produced. When the average particle diameter of the minute void particles is 20 µm or more, the surface smoothness of the obtained insulating layer is lowered. It is preferred that the minute particles be classified to have a uniform particle size.

The voidage of the minute void particles for use in the insulating layer is 30% or more, preferably 50% or more.

When the insulating layer interposed between the support and the heat activatable adhesion layer has a voidage of 30% or less, sufficient insulating properties cannot be obtained, so that the thermal energy applied to the adhesive layer by a heating medium for heat activation cannot be efficiently used for heat activation thereof and, hence, improvement in adhesion cannot be attained.

The term "voidage" of minute void particles herein is intended to refer to a percentage obtained by the following formula:

Voidage (%)=DI/DO×100 wherein DI and DO represent the inner and outer diameters of the void particles, respectively.

The minute void particles are formed of a thermoplastic resin which constitutes shells thereof, as previously mentioned. As the above-mentioned thermoplastic resin, a copolymer resin containing as major components vinylidene chloride and acrylonitrile is preferably employed.

Examples of the porous pigment for use in the non-expanded insulating layer include organic pigments such as urea-formaldehyde resin, and inorganic pigments such as shirasu clay.

The non-expanded insulating layer may be formed on the substrate as follows. The above-mentioned minute void particles or porous pigment particles are dispersed in water together with a binder to obtain a coating liquid. The coating liquid thus prepared is then coated on the substrate and dried to obtain the insulating layer formed on the substrate. In this case, the deposition amount of the minute void particles is preferably at least 1 g/m$^2$, more preferably in the range of about 2 to 15 g/m$^2$. The binder is generally used in an amount of 2 to 50% by weight based on the total weight of the minute void particles and the binder.

As the binder for the non-expanded insulating layer, a water-soluble polymer or an aqueous polymer emulsion is preferably used. Illustrative of suitable water-soluble polymers are polyvinyl alcohol, starch and starch derivatives, cellulose derivatives such as methoxy cellulose, hydroxyethyl cellulose, carboxymethyl cellulose, methyl cellulose and ethyl cellulose, sodium polyacrylate, polyvinyl pyrrolidone, acrylamide-acrylic ester copolymer, acrylamide-acrylic ester-methacrylic acid terpolymer, alkali salts of styrene-maleic anhydride copolymer, polyacrylamide, sodium alginate, gelatin and casein. Illustrative of suitable aqueous polymer emulsions are latexes such as styrene-butadiene copolymer and styrene-butadiene-acrylic copolymer and emulsions such as vinyl acetate resin, vinyl acetate-acrylic acid copolymer, styrene-acrylate copolymer, acrylate resin and polyurethane resin.

An expandable filler is used for formation of the expandable insulating layer. The expandable filler may be plastic void filler particles, each having a thermoplastic resin shell and a blowing agent, such as a low boiling point solvent, contained in the shell. The void plastic filler particles thus constructed are expanded when heated. It is preferred that the particle size of expandable plastic filler be in the range of 2 to 50 μm, more preferably 5 to 20 μm, in the non-expanded state, and in the range of 10 to 100 μm, more preferably 10 to 50 μm, in the expanded state.

Examples of the thermoplastic resins for forming the shell of the expandable plastic filler particles include polystyrene, polyvinyl chloride, polyvinylidene chloride, polyvinyl acetate, polyacrylate, polyacrylonitrile, polybutadiene and copolymers comprising monomers constituting the above-mentioned resin. As the blowing agent, propane, butane or a mixture thereof is generally employed.

The expanded insulating layer may be formed on the support as follows. A mixture of the above-mentioned expandable plastic filler and a binder is coated on the support and dried to obtain a coating. Then, the coating is contacted with a hot plate to expand the expandable filler. It is preferred that the deposition amount of the plastic filler be at least 1 g/m$^2$, more preferably about 2 to 5 g/m$^2$ in a non-expanded state. The binder may be added to the plastic filler in such an amount that can firmly bind the obtained expandable insulating layer to the support. In general, the amount of the binder is in the range of 5 to 50% by weight based on the total weight of the expandable plastic filler and the binder agent. The blowing temperature of the plastic filler is a softening point of the thermoplastic resin constituting the shell of the plastic filler particles. It is preferred that the blowing magnification be 2 to 4 times, more preferably 2 to 3 times.

The surface of the obtained insulating layer of an expanded type is considerably rough. Therefore, it is preferable to subject the insulating layer to a surface treatment by calendaring after expanding the plastic filler particles bye the application of heat thereto. When necessary, at least one undercoat layer may be provided on the insulating layer. Such an undercoat may also be provided under the insulating layer.

The above-mentioned insulating layer may further comprise auxiliary additives, such as a filler, a heat-fusible material and a surfactant. The filler and heat-fusible material previously described with regard to the heat-sensitive layer may also used for the insulating layer.

The substrate used in the foregoing embodiments may be any conventionally employed support such as paper (e.g. woodfree paper, art paper or coated paper) or a plastic film (e.g. a polyester film made of polyethylene terephthalate or polybutylene terephthalate, a cellulose derivative film made of cellulose triacetate, a polyolefin film made of polypropylene or polyethylene, a polystyrene film or a laminated film of the above-mentioned films).

The following examples will further illustrate the present invention. Parts and percentages are by weight.

EXAMPLE 1

Preparation of Plasticizer Dispersion (A)

Methyl 3-(3,5-di-tert-butyl-4-hydroxyphenyl)propionate (plasticizer) 40 parts
Polyvinyl alcohol (30% aqueous solution) 4 parts
Water 56 parts A mixture having the composition shown above was dispersed with a sand mill to obtain Dispersion (A) of the plasticizer having an average particle size of 1.0 μm.

Preparation of Adhesive Coating Liquid (B)

Methyl methacrylate-grafted natural rubber latex dispersion (solid content: 50%) 50 parts
Rosin ester dispersion (solid content: 50%) 35 parts
Dispersion (A) shown above 100 parts Above composition was mixed to obtain an adhesive coating liquid (B).

Preparation of Heat Activatable Adhesive Label

The coating liquid (B) was applied onto a paper having a basis weight of 80 g/m$^2$ and dried to form thereon a heat activatable adhesive layer having a dried weight of 25 g/m$^2$.

EXAMPLE 2

Preparation of Heat Activatable Adhesive Label

Example 1 was repeated in the same manner as described except that triethylene glycol-bis[3-(3-tert-butyl-5-methyl- 4-hydroxyphenyl)propionate] was substituted for methyl 3-(3, 5-di-tert-butyl-4-hydroxyphenyl)propionate.

EXAMPLE 3
Preparation of Heat Activatable Adhesive Label

Example 1 was repeated in the same manner as described except that 1,6-hexandiol-bis[3-(3-tert-butyl-5-methyl-4-hydroxyphenyl)propionate] was substituted for methyl 3-(3, 5-di-tert-butyl-4-hydroxyphenyl)propionate.

EXAMPLE 4
Preparation of Heat Activatable Adhesive Label

Example 1 was repeated in the same manner as described except that pentaerythrityl-tetrakis[3-(3-tert-butyl-5-methyl-4-hydroxyphenyl)propionate] was substituted for methyl 3-(3,5-di-tert-butyl-4-hydroxyphenyl)propionate.

EXAMPLE 5
Preparation of Heat Insulation Layer Coating Liquid (C)
Aqueous dispersion of minute void particles (copolymer resin comprising vinylidene chloride and acrylonitrile as the main components; solid content. 32%, average particle diameter: 5 μm and voidage: 92%) 30 parts
Styrene-butadiene copolymer latex 10 parts
Water 60 parts
Preparation of Corloring Agent Dispersion (D)
3-Dibenzylamino-6-methyl-7-anilinofluoran 20 parts
10% Aqueous polyvinyl alcohol 10 parts
Water 60 parts A mixture having the composition shown above was dispersed with a sand mill to obtain a coloring agent dispersion (D) having solid matters having an average particle size of 2.5 μm or less.
Preparation of Developer Dispersion (E)
4,4'-Dihydroxybenzophenone 10 parts
10% Aqueous polyvinyl alcohol 25 parts
Calcim carbonate 15 parts
Water 50 parts A mixture having the composition shown above was dispersed with a sand mill to obtain a developer dispersion (E) having solid matters having an average particle size of 2.5 μm or less.

One part of the dispersion (D) was blended with 8 parts of the dispersion (E) and stirred to obtain a heat-sensitive recording layer coating liquid (F).
Preparation of Heat-Sensitive Recording Adhesive Sheet The coating liquid (C) obtained above was applied onto a paper having a basis weight of 80 g/m$^2$ and dried to form thereon a heat insulating layer having a dried weight of 4 g/m$^2$. Then the coating liquid (F) obtained above was applied onto the insulating layer and dried to form thereon a heat-sensitive recording layer having a dried weight of 5 g/m$^2$. Then, the surface of the heat-sensitive recording layer was subjected to a supercalendering treatment so that the layer had a surface smoothness of 2,000 sec in accordance with the method of Ohken-shiki prescribed in Japan Tappi No. 5. The adhesive coating liquid (B) obtained in Example 1 was applied onto a surface of the above paper opposite the heat-sensitive recording layer and dried to form thereon a heat activatable adhesive layer having a dried weight of 25 g/m$^2$, thereby obtaining a heat-sensitive recording adhesive sheet.

EXAMPLE 6

Example 5 was repeated in the same manner as described except that the heat insulating layer was not formed. Thus, the heat-sensitive recording layer was formed directly on the paper substrate.

Comparative Example 1
Preparation of Heat Activatable Adhesive Label

Example 1 was repeated in the same manner as described except that dicyclohexyl phthalate was substituted for methyl 3-(3,5-di-tert-butyl-4-hydroxyphenyl)propionate.

Comparative Example 2
Preparation of Heat Activatable Adhesive Label

Example 1 was repeated in the same manner as described except that diphenyl phthalate was substituted for methyl 3-(3,5-di-tert-butyl-4-hydroxyphenyl)propionate.

Comparative Example 3

Example 5 was repeated in the same manner as described except that dicyclohexyl phthalate was substituted for methyl 3-(3,5-di-tert-butyl-4-hydroxyphenyl)propionate.

Comparative Example 4

Comparative Example 3 was repeated in the same manner as described except that the heat insulating layer was not formed.

The thus obtained sheets were tested for adhesiveness, anti-blocking property and dynamic color density (in the case of the heat-sensitive recording sheets) according to the following methods.

Adhesiveness sample sheet is placed in a thermostatic vessel at 90° C. for 1 minute for the activation of the adhesive layer. The activated sample is applied to a plastic sheet (polyvinyl chloride sheet (VC) and polyethylene sheet (PE)). Adhesion between the sheet and the sheet is evaluated according to the following ratings:
A: strong
B: fair (practically no problem)
C: weak Anti-blocking Property Two same samples are stacked with the top surface of one sample being contacted with the bottom surface of the other. The stacked samples are placed at a constant temperature (40° C., 50° C. and 60° C.) and a constant humidity of 30% RH for 24 hours while being applied with a pressure of 2 kg/cm$^2$. The stacked samples are cooled to room temperature and separated from each other. Anti-blocking property is evaluated according to the following ratings;
A: Separated without generating a sound (no blocking)
B: Separated with generation of a sound (almost no blocking)
C: Slight blocking (practically no problem)
D: Blocking Dynamic Coloring Density Sample heat-sensitive recording sheet is loaded in a thermosensitive printing test apparatus equipped with a commercially available thin film head (made by Matsushita Electronic Components Co., Ltd.), and images are thermally printed on the sample under the following conditions:

Electric power applied: 0.6 W/dot
Recording time for one line; 10 msec/line
Scanning density; 8×7.7 dot/mm
Pulse width: 0.4 msec and 0.5 msec.

The coloring density of the images recorded on the sample sheet is measured using a McBeth densitometer RD-914.

The results are shown in Table 1.

| Example | Adhesion | | Anti-blocking | | | Color Density | |
|---|---|---|---|---|---|---|---|
| | VC | PE | 40° C. | 50° C. | 60° C. | 0.4 msec | 0.5 msec |
| 1 | A | A | A | C | D | — | — |
| 2 | A | A | A | A | B | — | — |
| 3 | A | A | A | A | B | — | — |
| 4 | A | A | A | A | A | — | — |
| 5 | A | A | A | C | D | 0.82 | 1.25 |
| 6 | A | A | A | C | D | 0.61 | 1.03 |
| Comp. 1 | B | B | B | D | D | — | — |
| Comp. 2 | B | C | A | B | D | — | — |
| Comp. 3 | B | B | B | D | D | 0.81 | 1.26 |
| Comp. 4 | B | B | B | D | D | 0.60 | 1.02 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A heat activatable adhesive composition, comprising:

a thermoplastic resin; and a plasticizer including a hindered phenol compound which is solid at 20° C. and which is fusible at an elevated temperature;

wherein said thermoplastic resin and said hindered phenol compound are present in amounts of 10–70% by weight and 30–70% by weight, respectively.

2. A composition as claimed in claim 1, wherein said hindered phenol compound is represented by the following formula (I):

$$\text{(I)}$$

[Structure: HO-phenyl(R$_1$, R$_2$)-CH$_2$CH$_2$COOR$_3$]

wherein $R_1$, $R_2$ and $R_3$ each stand for an alkyl group.

3. A composition as claimed in claim 1, wherein said hindered phenol compound is represented by the following formula (II):

$$\text{(II)}$$

[Structure: (HO-phenyl(R$_4$, R$_5$)-CH$_2$CH$_2$COOCH$_2$CH$_2$OCH$_2$)$_2$]

wherein $R_4$ and $R_5$ each stand for an alkyl group.

4. A composition as claimed in claim 1, wherein said hindered phenol compound is represented by the following formula (III):

$$\text{(III)}$$

[Structure: (HO-phenyl(R$_6$, R$_7$)-CH$_2$CH$_2$COO)$_2$-R$_8$]

wherein $R_6$ and $R_7$ each stand for an alkyl group and $R_8$ stands for a divalent hydrocarbyl group.

5. A composition as claimed in claim 1, wherein said hindered phenol compound is represented by the following formula (IV):

$$\text{(IV)}$$

[Structure: (HO-phenyl(R$_9$, R$_{10}$)-CH$_2$CH$_2$COO-R$_{11}$)$_4$-C]

wherein $R_9$ and $R_{10}$ each stand for an alkyl group and $R_{11}$ stands for a divalent hydrocarbyl group.

6. A composition as claimed in claim 1, further comprising a tackifier.

7. A sheet comprising a substrate and an adhesive layer of a heat activatable adhesive composition according to claim 1 provided on at least one side of said substrate.

8. A sheet as claimed in claim 7, further comprising a heat insulating layer interposed between said substrate and said adhesive layer.

9. A sheet as claimed in claim 7, wherein said adhesive layer is provided only one side of said substrate, said sheet further comprising a heat-sensitive recording layer provided on the other side of said substrate.

10. A sheet as claimed in claim 9, further comprising an undercoat layer interposed between said substrate and said heat-sensitive recording layer.

11. A sheet as claimed in claim 9, wherein said heat-sensitive recording layer has an ink image printed thereon.

12. A sheet as claimed in claim 9, further comprising a protecting layer provided on said heat-sensitive recording layer.

13. A sheet as claimed in claim 12, wherein said protecting layer has an ink image printed thereon.

14. A sheet as claimed in claim 7, wherein said adhesive layer is provided only one side of said substrate, said sheet further comprising an image receiving layer provided on the other side of said substrate for receiving an ink image transferred from an ink ribbon.

* * * * *